United States Patent [19]
Hoffman

[11] 3,865,319
[45] Feb. 11, 1975

[54] MULTIPLE HELICAL BLADE ROTARY GRINDER FOR LIGHT DENSITY MATERIAL

[75] Inventor: Rudolf Hoffman, Oceanside, Calif.

[73] Assignee: The Rainville Company Inc., Middlesex, N.J.

[22] Filed: Apr. 25, 1972

[21] Appl. No.: 247,387

[52] U.S. Cl. ............... 241/188 R, 241/73, 241/89.3
[51] Int. Cl. ........................................... B02c 18/14
[58] Field of Search ............ 241/73, 82.1, 89, 89.3, 241/92, 93, 188, 296, 282.1, 292.1

[56] References Cited
UNITED STATES PATENTS

| | | | |
|---|---|---|---|
| 506,117 | 10/1893 | Josselin | 241/89.3 |
| 1,540,908 | 6/1925 | Shelton | 241/188 R X |
| 2,171,296 | 8/1939 | Youngman et al. | 241/188 R X |
| 2,222,073 | 11/1940 | Hauge | 241/226 X |
| 2,991,948 | 7/1961 | Hummelen | 241/73 |

FOREIGN PATENTS OR APPLICATIONS 171,102 4/1960 Sweden ................................ 241/73

*Primary Examiner*—Gerald A. Dost
*Assistant Examiner*—E. F. Desmond
*Attorney, Agent, or Firm*—Sandoe, Hopgood & Calimafde

[57] ABSTRACT

This rotary grinder, for cutting up or grinding light density material such as plastic foam, has a housing with a spiral blade rotary cutter that cuts against a relatively fixed blade attached to the inside of the housing and extending parallel to the axis of rotation of the spiral blade. There are preferably fixed blades on both sides of the rotary cutter forming partitions between the rotary cutter and the sides of the housing to prevent any material from dropping into the bottom of the housing below the cutter without touching the cutter. The housing and the cutter slope upward toward one end. The material to be cut is fed into the housing from a hopper at the low end and the spiral of the cutter has a pitch that urges pieces of material toward the higher end of the housing.

4 Claims, 3 Drawing Figures

PATENTED FEB 1 1 1975　　　　　　　　　　　　　　3,865,319
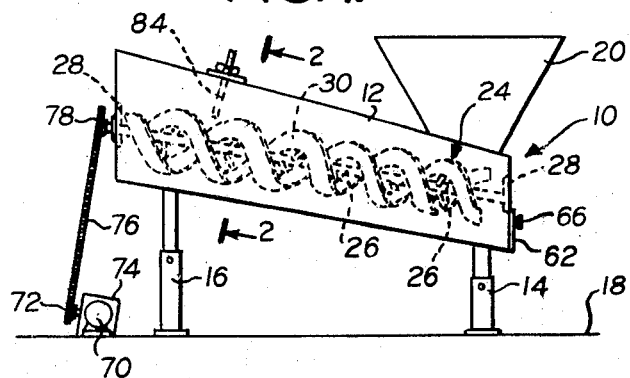
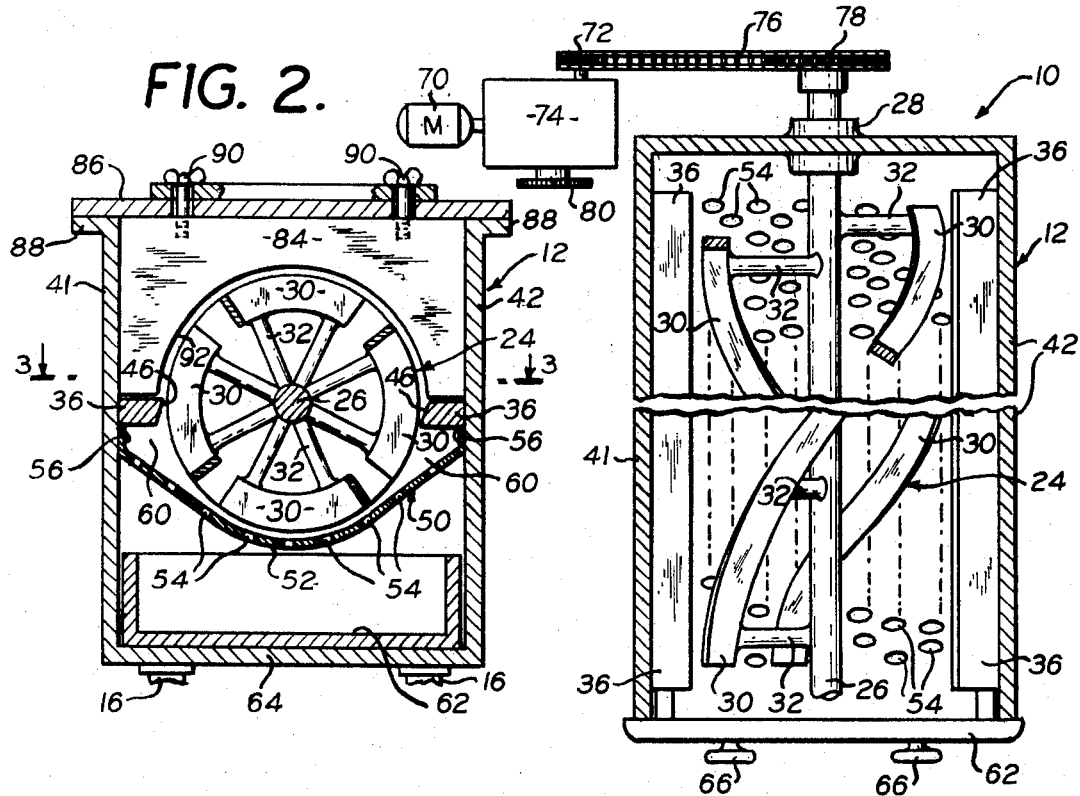

3,865,319

MULTIPLE HELICAL BLADE ROTARY GRINDER FOR LIGHT DENSITY MATERIAL

BACKGROUND AND SUMMARY OF THE INVENTION

It is practical to re-use waste plastic material from manufacturing processes if it is ground up economically. This invention provides a novel grinder for light density material such as plastic foam, and the construction of the grinder makes it inexpensive and economical to operate.

A cutter with spiral blades rotates about a longitudinal axis in a housing and cuts the material against one or more shear blades that are fixed to the inside of the housing and that serve to form a partition between the cutter and the sides of the housing so that no material above the cutter can drop into the part of the housing below the cutter without being struck by the cutter.

There is a bottom wall under the cutter with perforations through which small pieces of material fall and the material is circulated across the top of the bottom wall by the action of the rotary cutter. The bottom wall has a cylindrical portion with a curvature substantially concentric with that of the cutter along an angular extent of approximately 30° or more of the circumference of the path of the cutter blades and the blades move the chopped up material across this cylindrical portion of the bottom as they rotate.

The bottom diverges from the path of the cutter on both sides of the cutter and extends to locations on the sides of the housing below the relatively fixed blades and leaves space under the fixed blades for material to accumulate so that it can be thrust upward on the side of the cutter on which the blades are rising.

In the preferred construction, the housing slopes upwardly and the material to be ground is dropped into the housing from a hopper at the low end. The pitch of the spiral cutter blades is such that these blades tend to thrust the material toward the high end of the housing and as pieces are thrown outward by the blades and strike against the top of the housing, they tend to fall back nearer the low end so that there is more of a circulation of the pieces to be cut. A fixed partition near the high end of the housing extends from the cutter to the sides and top of the housing to prevent material that is urged toward the high end from becoming jammed against the end of the housing beyond the cutter.

Other objects, features, and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic side elevation of a rotary grinder made in accordance with this invention;

FIG. 2 is an enlarged sectional view taken on the line 2—2 of FIG. 1; and

FIG. 3 is a sectional view taken on the line 3—3 of FIG. 2.

DESCRIPTION OF PREFERRED EMBODIMENT

FIG. 1 shows a rotary cutter or grinder 10 comprising a housing 12 supported by legs 14 and 16 from a floor or other underlying support 18. The preferred construction has the legs 14 and 16 of different lengths so that the housing 12 slopes upward toward one end.

There is a hopper 20 at the low end of the housing 12 and this hopper communicates at its lower end with the interior of the housing 12 so that material dropped into the hopper 20 falls into the housing 12 above a cutter 24 which has an axle 26 that turns in bearings 28 in end walls of the housing 12.

The cutter 24 has a plurality of spiral or helical blades 30 angularly spaced around the circumference of the cutter and these blades 30 are generally similar to the spiral blades on reel type lawn mowers. Spokes 32 for supporting the spiral or helical blades 30 extend from the axle 28 and are integrally connected with the axle 28 and with the blades 30.

Within the housing 12 there are knives or shear blades 36 which are preferably rigidly connected to side walls 41 and 42 (FIG. 2) of the housing 12. These relatively stationary blades 36 are in position to cooperate with the helical blades 30 of the cutter 24 so that these blades 30 of the cutter shear the material against the blades 36.

Each of the blades 36 has a rake 46 which is oriented so as to make the different blades 36 cooperate with the direction of rotation of the cutter 24. For example, the blade 36 on the wall 41 is oriented to cooperate with a rising blade 30; and the blade 36 on the wall 42 is oriented to cooperate with a descending blade 30. The cutter 24 turns in a clockwise direction as viewed in FIG. 2. If the cutter rotation were in the opposite direction, then the orientation of the blades as to their rakes 46 would have to be reversed.

Below the cutter 24 there is a bottom wall 50 which has a mid portion 52. This mid portion is cylindrical and has its axis of curvature coincident or substantially coincident of the axis of rotation of the axle 28. The cylindrical mid portion 52 of the bottom wall 50 is spaced a short distance from the circumference of the cutter 24 so as to provide some clearance for chopped up particles of material that are brushed across the bottom wall 50 by the rotary action of the cutter 24. The bottom wall 50 has perforations 54 therein and particles that are small enough pass through the openings 54 which serve as screen openings for determining the size of particles which the cutter produces.

The bottom wall 50 extends toward the side walls 41 and 42 and has vertically extending portions 56 that are detachably connected to the side walls by fastening means such as screws. Bottom walls having openings or perforations of different size can be substituted for the bottom wall 50 shown in the drawing, and such substitutions are made to change the size of the particles to which the apparatus cuts the material fed into the housing.

There is a gradual upslope of the bottom wall 50 beyond the mid cylindrical portion 52 and this slope is gradual enough so as to leave spaces 60 under the blades 36 for some accumulation and circulation of material which is thrown outward by the cutter blades below the shear blades 36.

Under the perforated bottom 50 there is a drawer 62 which rests on a lower bottom wall 64 of the housing.

This drawer 62 can be pulled out from the lower end of the housing 12 by a handle 66 shown in FIG. 1. When sufficient material has accumulated in the drawer 62 the cutter is stopped and the drawer 62 is removed and dumped and then replaced preparatory to accumulating more chopped-up material.

The cutter 24 is rotated by a motor 70 which operates a sprocket 72 at the output end of transmission gearing 74. The sprocket 72 drives a chain 76 which passes around another sprocket 78 secured to the end of the axle 26 at the upper end of the housing 12.

This driving mechanism is shown more fully in FIG. 3 where the transmission 74 is shown equipped with an adjustment knob 80 for varying the change of speed through the transmission 74 between the motor 70 and the sprocket 72. The speed of the cutter 24 can thus be changed to suit the particular material which is being cut up in the housing.

Referring again to FIG. 1, the material which falls from the hopper 20 into the housing 12 above the cutter 24 is urged toward the high end of the housing 12 by the counterclockwise rotation of the spiral blades of the cutter, and at the same time these blades carry pieces of the material into contact with the shear blades and cut the material against the shear blades into progressively smaller pieces as the operation of the apparatus continues. Pieces of material that are thrown off, by centrifugal action of the cutter blades 30, against the top and sides of the housing above the axis of the cutter tend to fall vertically and because of the upward slope of the housing this vertical fall tends to move these falling pieces nearer the low end of the housing. The steeper the inclination of the housing the more this effect of falling back toward the low end will occur. It is not desirable to have the slope of the housing greater than 45°. Expressed in another way, it might be said that the axis of the cutter 24 extends in a direction having a horizontal component equal to or preferably greater than its vertical component.

The optimum angle for the slope of the housing 12 depends to some extent upon the speed of rotation of the cutter 24 and to a greater extent upon the density of the material. The angle of slope can be adjusted by changing the lengths of the legs 14 and 16 and telescoping legs can be used in order to obtain this adjustment. No detail of the leg construction is shown herein since telescoping legs are well-known and no further explanation of them is necessary for a complete understanding of the present invention.

The invention will operate without any upward slope for the housing but the distribution of the material which comes through the perforated bottom under the cutter will not be as uniform if there is no slope to the housing. In practice, the slope of the housing 12 should be adjusted so as to obtain the most uniform distribution of the ground material lengthwise of the drawer 62 which underlies the full length of the perforated bottom wall through which the ground material is screened.

In order to prevent excessive accumulation of material above the cutter 24 at the upper end of the housing 12, as the result of the spiral feed action of the cutter 24, there is a partition wall 84 extending downward from a cover or top wall 86 of the housing 12. This top wall 86 is detachably secured to flanges 88 at the upper ends of the side walls 41 and 42, as shown in FIG. 2. The partition wall 84 has screws 90 extending through the top wall and threaded into the upper end of the partition wall 84. The partition wall 84 is thus secured to the cover or top wall 86 and can be lifted out of the housing by removing the top wall 86.

Partition wall 84 is of substantially the same width as the space between the walls 41 and 42, or slightly narrower than this space. The partition wall 84 extends down into substantial contact with the relatively fixed shear blades or knives 36 and there is a circular edge 92 of the partition wall 84 which is of a curvature concentric with the axle 26 with running clearance between the edge 92 and the outer edges of the blades 30 of the cutter 24. Thus the partition wall 84 blocks any further axial travel of material which is thrust against it by the spiral feeding action of the cutter 24.

However, the partition wall 84 is preferably located some distance from the high end of the cutter 24 and from the ends of the shear blades 36. Thus some material which passes under the partition wall 84 and which may be between the angularly spaced helical blades 30 or in the space where the spokes 32 are located, can still be chopped up by the cutter 24 against the shear blades in the portion of the housing on the high side of the partition wall 84. If only a limited amount of material gets into this space, no problems are presented since there is not enough to pack against the end wall of the housing and to interfere with the operation of the cutter 24.

The apparatus can be operated without the partition 84 if the slope of the housing 12 is correlated with the speed of the cutter and the density of the material so that an even distribution of material is obtained under the bottom perforated wall or in cases where the slope is such that greater amounts of material come through the perforated bottom wall near the lower end of the housing. The partition wall 84 has the outstanding advantage, however, that it permits the apparatus to be used effectively without accurate adjustment of the slope of the housing with respect to the density of material and other operating conditions.

The preferred embodiment of the invention has been illustrated and described, but changes and modifications can be made and some features can be used in different combinations without departing from the invention as defined in the claims.

What is claimed is:

1. A rotary grinder including a housing into which is loaded material to be ground up, two relatively fixed shear blades secured to the inside of the housing, a cutter in the housing rotatable about an axis, the cutter having a plurality of helical blades spaced axially around the circumference of the cutter and with edges that move adjacent to the relatively fixed shear blades as the cutter rotates, the two relatively fixed shear blades being on opposite sides of the cutter and one being oriented to shear against a descending cutter blade and the other being oriented to shear against an ascending cutter blade, bearings on which the cutter rotates about said axis, which axis is parallel to the shearing edges of the fixed shear blades, and means for rotating the cutter, characterized by the housing having a bottom immediately below the cutter and sloping upward toward one end, the cutter sloping upward with the bottom and at substantially the same angle as the bottom, the means for rotating the cutter turning it in a direction to thrust the material to be cut in the direction of the higher end of the bottom of the housing, a partition spaced from the higher end of the cutter and extending from one side wall to the other and across the top of the cutter near the high end of the cutter and generally normal to the axis of rotation of the cutter for preventing the material to be cut from being thrust upward to the extreme end of the cutter, and space in the chamber above the cutter in which material thrown upward by the cutter blades can drop back by gravity toward the lower end of the cutter.

2. The rotary described in claim 1 characterized by the entire housing having an upward slope less than 45°, a hopper on top of the housing at the low end thereof and communicating through the top of the housing with the space within the housing and in which the cutter is contained, the hopper being so located that material from the hopper drops by gravity into the rotating cutter, and an outlet from the housing at the lower end thereof and below the cutter for removing material cut up by the cutter in cooperation with the relatively fixed blades.

3. A rotary grinder including a housing into which is loaded material to be ground up, relatively fixed shear blades secured to the inside of the housing, a cutter in the housing rotatable about an axis, the cutter having helical blades with edges that move adjacent to the relatively fixed shear blades as the cutter rotates, bearings on which the cutter rotates about said axis, which axis is parallel to the shearing edges of the fixed shear blades, and means for rotating the cutter, characterized by the housing and said axis sloping upward toward one end of the housing, the means for rotating the cutter turning in a direction to make the helical blades thrust material toward the high end of the housing so that any tumbling of the material causes it to fall back toward the low end of the housing and thereby increasing contacts of the material with the blades.

4. A rotary grinder including a housing into which is loaded material to be ground up, relatively fixed shear blades secured to the inside of the housing, a cutter in the housing rotatable about an axis, the cutter having helical blades with edges that move adjacent to the relatively fixed shear blades as the cutter rotates, bearings on which the cutter rotates about said axis, which axis is parallel to the shearing edges of the fixed shear blades, and means for rotating the cutter, characterized by the cutter having the helical blades spaced axially around the circumference of the cutter and the relatively fixed shear blades being on opposite sides of the cutter and one shear blade being oriented to shear against a descending cutter blade and the other shear blade being oriented to shear against an ascending cutter blade, characterized by a perforated bottom partition under the cutter and adjacent to the circumference of the cutter under the axis of the cutter and for an angular extent of at least 15° to either side of a substantially vertical plane through said axis, the perforated bottom sloping upward toward both sides of the housing with progressively greater distances from the cutter and sloping upward progressively into contact with the side wall of the housing to a location under at least the relatively fixed shear blade that is oriented to shear against an ascending cutter blade.

* * * * *